UNITED STATES PATENT OFFICE.

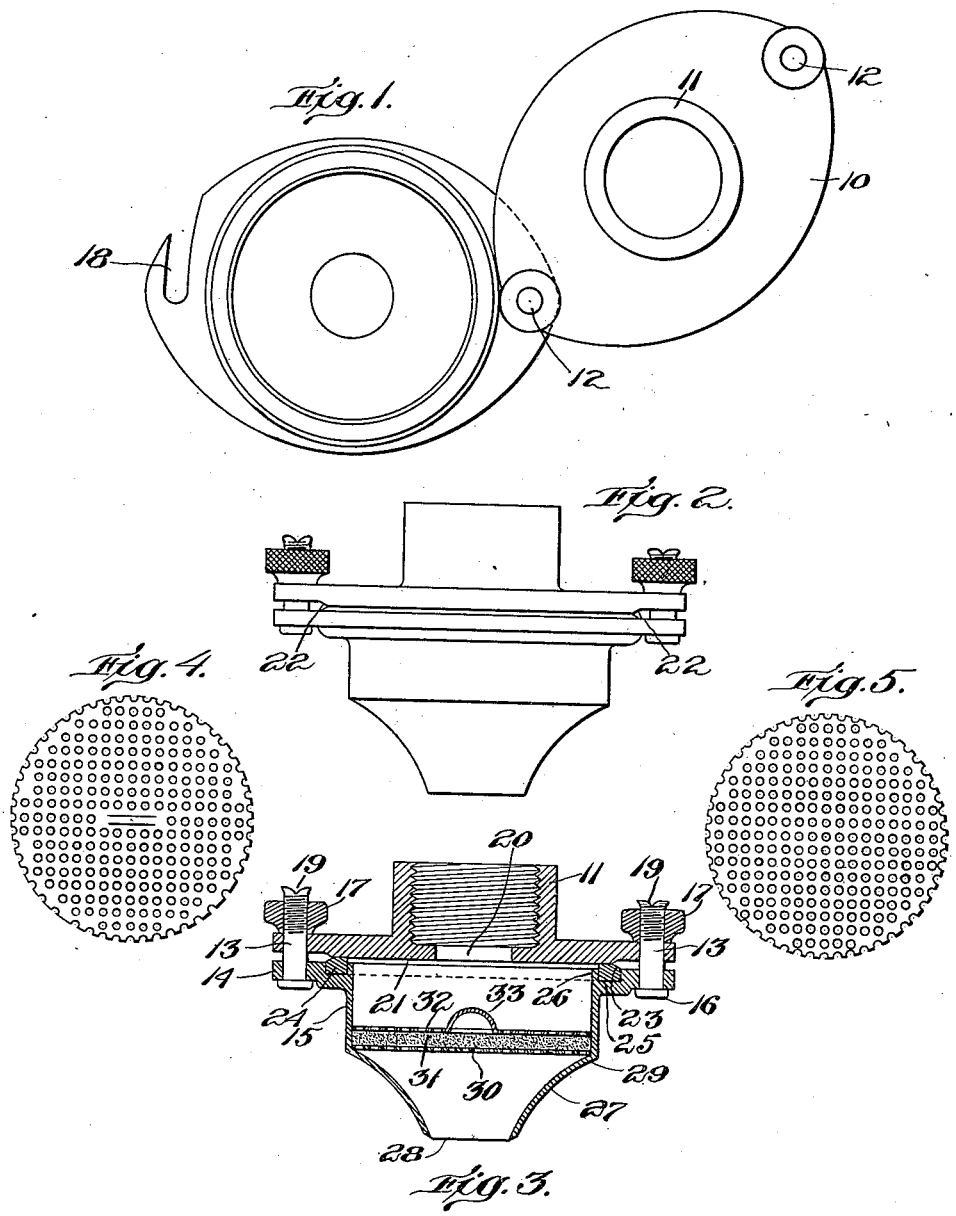

MICHAEL HAYES MALONEY, OF PLYMOUTH, MASSACHUSETTS, ASSIGNOR OF ONE-HALF TO JOHN J. BUCKLEY, OF PLYMOUTH, MASSACHUSETTS.

FILTER.

1,098,352. Specification of Letters Patent. Patented May 26, 1914.

Application filed November 29, 1912. Serial No. 734,141.

*To all whom it may concern:*

Be it known that I, MICHAEL H. MALONEY, of Plymouth, in the county of Plymouth and State of Massachusetts, have invented certain new and useful Improvements in Filters, of which the following is a specification.

My invention relates to water purifying means of a type which while having other and more general fields of usefulness is well adapted for application to household faucets and like uses.

Among the prime objects of the invention are to provide a filtering device capable of being easily and completely cleansed without disassemblage of the main parts of the device, so that danger of denting or distorting of the larger parts is avoided.

The invention also provides a construction wherein a packing between the parts is securely held while the parts are moved relative to each other for cleaning, the gasket and the face coöperating therewith being formed so that the tendency to displace or injure the gasket is minimized.

A further object of the invention is to provide a filtering device so placed in a container that the filtering elements can be easily and quickly taken out, these elements and also the container itself being so shaped that they are then easily and effectively cleaned.

The above and other objects and features of the invention will be better understood from the following detailed description taken in connection with the accompanying drawings and will be thereafter pointed out in the appended claims.

Referring to the drawings, Figure 1 is a plan view showing my improved filter with the parts moved to position for cleansing. Fig. 2 is a side elevation with the filter parts assembled for use; Fig. 3 is a central vertical section through the filter; and Figs. 4 and 5 are plan views of the upper and lower strainer elements respectively, removed.

In the preferred embodiment of the invention shown, a plate 10 is provided of a generally oval form with an internally threaded collar 11 extending up therefrom for attachment to the faucet or other water dispensing device. This plate has at its ends holes 12, 12 for the reception of bolts 13 for engaging through a peripheral flange 14 at the top of the filter container 15 to hold and clamp said container up against the plate 10; the bolts 13 for this purpose having heads 16 at their lower ends and having their tops threaded to receive nuts 17. The filter container 15 is adapted to swing on one of the bolts 13 as a pivot axis, this bolt fitting a hole at one side of said flange, while to permit such swinging, the other bolt 13 engages into an open slot 18 at the other side of said flange. This construction thus permits the container 15 to be swung around from under the plate 10 so that the filter elements therein are accessible. For this operation the nuts 17 are loosened and to prevent complete disengagement of said nuts from their respective bolts I upset or distort the tops of the bolts somewhat as seen at 19 whereby chance disengagement of the parts and consequent dropping down of the container 15 is avoided. This is an important point since the parts including the container 15 are usually made of pressed copper sheet stock which is very apt to become dented or otherwise distorted by dropping to the floor, or other accident incident to its detachment from the holding plate 10. The plate 10 is shown as having a central circular portion thereof surrounding the water passage 20 thickened somewhat in a downward direction presenting a face seen at 21 the periphery whereof is beveled off as at 22 for coöperation with a like bevel 23 at the top outer corner of a gasket 24 fitted in a seat 25 at the top of the container 15. The stock of the container is extended up within the gasket 24 to form an annular holding rim 26 to securely hold the gasket in place, this rim terminating a little short at the top of the gasket to permit expansion of the gasket as is usual. The filter container 15 as shown is formed with a short cylindrical portion merging into an inwardly and downwardly tapering nose 27 terminating in an outlet 28. It is to be observed that this construction provides a substantially obtuse angled shoulder at 29 upon which removably rests a lower strainer plate 30. A filter member shown as of pad form but which may be granular or otherwise as indicated at 31 rests on the lower strainer plate 30 with an upper strainer plate 32 seated thereon, the filter pad 31 and the upper strainer 32 being likewise removable, preferably individually, and the upper strainer having for this purpose a hand piece 33 struck up therefrom. It is to be observed that with this construction as the container 15 is swung around from under the plate 10, the water purifying means consisting of the lower and upper strainer plates 30, 32 and the intermediate filter pad or other filtering means, are instantly removed and are of such a form that when removed they can be quickly and easily cleaned, having no projecting parts, corners or holding devices capable of catching dirt or germs, and it is further to be specially noted that the obtuse angled shoulder 29 on which the filtering device rests is adapted to be easily and effectively cleaned since by reason of such obtuse formation the tendency for dirt or debris to collect therein is minimized and it is relatively open and freely accessible for a cleansing implement.

The beveled formations 22, 23, on the lower face of the holder plate 10, and the gasket respectively, coöperate to permit the easy replacement of the filter container as it is swung around for cleaning and back, and the special arrangement of the holding bolts 13 with their upset ends 19 with the open slot 18 to permit the swinging movement described makes possible a complete and convenient accessibility of the parts for cleansing while completely eliminating the annoyance of misplacing parts as well as the danger of injuring the container 15. I am aware that the invention can be embodied in other forms without departing from the essential attributes thereof and I therefore do not desire to be limited to the precise embodiment shown but refer to the appended claims rather than to the foregoing description to indicate the scope of my invention.

Having described my invention what I claim as new and desire to secure by Letters Patent is:

1. A filter comprising an upper holding plate member formed with a water inlet connection at its top and presenting a continuous lower plane face, a container underneath having a seat formation to receive water purifying means in a lower part thereof with a sediment cup space above said water purifying means, there being securing means for holding said plate member and said container together consisting in a vertical pivot bolt and a coöperative holding member spaced therefrom, said parts being formed to permit a sliding swinging movement of said container in a horizontal plane on the lower plane face of said plate member about said pivot bolt upon a relatively slight loosening of said securing means, and water purifying means fitted to said seat in said container.

2. A filter comprising an upper holding plate member formed with a water inlet connection at its top and presenting a lower plane face, a container underneath having a seat formation to receive water purifying means in a lower part thereof with a sediment holding cup space of substantial depth above said water purifying means, there being opposite vertical bolts securing said plate member and said container together and said plate member and container having provision for fitting together to form a water-tight joint, said parts being formed to permit a sliding swinging movement of said container in a horizontal plane on the lower plane face of said plate member about one of said bolts as a pivot upon a relatively slight loosening of said bolts, and water purifying means removably fitted to said seat in said container, said bolts having provision to prevent disassemblage of said container from said plate member.

In testimony whereof I have affixed my signature, in presence of two witnesses.

MICHAEL HAYES MALONEY.

Witnesses:
C. L. ROGERS,
L. A. JORDAN.